United States Patent
Wang et al.

(10) Patent No.: US 12,358,166 B2
(45) Date of Patent: Jul. 15, 2025

(54) HYGIENIC ASSEMBLY AND HYGIENIC ROBOT

(71) Applicant: ABB Schweiz AG, Baden (CH)

(72) Inventors: Kangjian Wang, Shanghai (CN); Shifu Cheng, Shanghai (CN); Tao Zhang, Shanghai (CN); Haiwei Li, Shanghai (CN); Xiaodong Cao, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/559,546

(22) PCT Filed: Jun. 17, 2021

(86) PCT No.: PCT/CN2021/100596
§ 371 (c)(1),
(2) Date: Nov. 7, 2023

(87) PCT Pub. No.: WO2022/261894
PCT Pub. Date: Dec. 22, 2022

(65) Prior Publication Data
US 2024/0238994 A1    Jul. 18, 2024

(51) Int. Cl.
B25J 19/00    (2006.01)
B25J 17/02    (2006.01)

(52) U.S. Cl.
CPC ........... *B25J 17/02* (2013.01); *B25J 19/0075* (2013.01)

(58) Field of Classification Search
CPC .............................. B25J 19/0075; B25J 17/02
See application file for complete search history.

(56) References Cited

U.S. PATENT DOCUMENTS

| | | | |
|---|---|---|---|
| 11,955,873 B2* | 4/2024 | Gandolfi | H02K 7/116 |
| 2001/0045808 A1 | 11/2001 | Hietmann et al. | |
| 2014/0102240 A1 | 4/2014 | Kaisha | |
| 2016/0101526 A1* | 4/2016 | Saito | H02K 11/215 |
| | | | 74/490.06 |
| 2017/0217025 A1 | 8/2017 | Okada | |
| 2017/0266820 A1 | 9/2017 | Zhu | |

(Continued)

FOREIGN PATENT DOCUMENTS

| | | |
|---|---|---|
| CN | 101403583 A | 4/2009 |
| CN | 101769373 B | 7/2010 |
| CN | 102729257 B | 10/2012 |

(Continued)

OTHER PUBLICATIONS

International Search Report and Written Opinion from corresponding International PCT application No. PCT/CN2021/100596, mailed Mar. 21, 2022.

*Primary Examiner* — Bobby Rushing, Jr.
(74) *Attorney, Agent, or Firm* — GREENBERG TRAURIG, LLP

(57) ABSTRACT

A hygienic assembly and a hygienic robot. The hygienic assembly includes a housing adapted to be connected to a reduction box of a joint of the robot, an opening, and a flange having a first end for connecting to an output member of the reduction box and a second end for connecting to an end effector. The assembly also includes a seal member which includes an outer ring fixed to an inner circumferential surface of the opening and a seal lip slidably contacting an outer circumferential surface of the flange.

10 Claims, 5 Drawing Sheets

(56) References Cited

U.S. PATENT DOCUMENTS

2020/0009747 A1* 1/2020 Inoue .................. B25J 17/0283

FOREIGN PATENT DOCUMENTS

| | | | |
|---|---|---|---|
| CN | 105443733 A | 3/2016 | |
| CN | 108144899 A | 6/2018 | |
| CN | 109519339 B | 3/2019 | |
| CN | 110228083 A | 9/2019 | |
| CN | 107206596 B | 11/2020 | |
| CN | 112754376 A | 4/2022 | |
| DE | 4015644 C2 | 1/1994 | |
| DE | 19717516 A1 | 10/1998 | |
| EP | 1663571 A | 3/2005 | |
| EP | 2735410 A2 | 5/2014 | |
| JP | 5277853 A | 6/1977 | |
| JP | S5624222 A | 3/1981 | |
| JP | S6383122 A | 3/1981 | |
| JP | 10153219 A | 6/1998 | |
| JP | 4765210 B2 | 1/2003 | |
| WO | WO-2020084316 A1 * | 4/2020 | .............. B25J 9/103 |

* cited by examiner

HYGIENIC ASSEMBLY AND HYGIENIC ROBOT

CROSS-REFERENCE TO RELATED APPLICATIONS

This is a national stage application claiming priority to international patent application Serial No.: PCT/CN2021/100596, filed on Jun. 17, 2021; which is herein incorporated by reference in its entirety.

FIELD

Embodiments of the present disclosure generally relate to the field of robots, and more particularly, to a hygienic assembly and a hygienic robot.

BACKGROUND

Robots are widely used in many industrial and commercial applications to perform precise and repetitive movements. For example, the robots may pick and place parts, apply spray paint, perform welding, remove burrs or apply sealant to joints. In these applications, structural members (or structural parts) of the robots are typically designed to bear certain mechanical loadings, such as certain mechanical torques and weights.

In emerging applications of the robots in some particular fields, such as food, beverage and heath care, a more rigorous hygienic standard is required for the robots. For example, in a specific application, materials of the robots might be required to prevent accumulation of substances on an exposed surface of the robots or to prevent bacteria growth and reproduction on the exposed surface. Moreover, the exposed surface should be easy to clean, such as by rinsing or wiping. Accordingly, there is a need for an improved structure for use with the robots to improve the hygienic level of the robots.

SUMMARY

In view of the foregoing problems, example embodiments of the present disclosure propose a hygienic assembly for uses with a robot so as to improve the hygienic level of the robots and a hygienic robot that is easy to clean.

In a first aspect of the present disclosure, a hygienic assembly for use with a robot is provided. The hygienic assembly comprises: a housing adapted to be connected to a reduction box of a joint of the robot and comprising an opening; a flange having a first end for connecting to an output member of the reduction box and a second end for connecting to an end effector; and a seal member comprising an outer ring fixed to an inner circumferential surface of the opening and a seal lip slidably contacting an outer circumferential surface of the flange.

With these embodiments, the reduction box can be at least partially covered by the housing, the flange and the seal member. Thus, a shield structure is created for the reduction box, and an outer surface of the joint of the robot is easy to clean. In addition, substances will not accumulate on the outer surface of the joint and bacteria will not grow or reproduce on the outer surface of the joint.

In some embodiments, the housing comprises: a tubular member adapted to be connected to the reduction box; and a ring member arranged on the tubular member and comprising the opening. With these embodiments, the housing can be manufactured simply and the housing is easy to assemble onto the reduction box.

In some embodiments, the tubular member comprises: a cylindrical portion adapted to accommodate the reduction box; and an inner connecting portion inwardly extending from the cylindrical portion and comprising at least one hole provided for at least one bolt to pass through to connect the tubular member to the reduction box, wherein the ring member is screwed to the cylindrical portion.

With these embodiments, the tubular member and the ring member can be easily assembled. On the one hand, the cylindrical portion that accommodates the reduction box is easy to clean and can prevent the substances or bacteria from accumulating or growing on the joint. On the other hand, when the reduction box needs maintenance or when checking for leakage, the cylindrical portion is easy to disassemble from the reduction box.

In some embodiments, the tubular member comprises: a cylindrical portion adapted to accommodate the reduction box, wherein an inner surface of the cylindrical portion is adapted to be adhered to the reduction box, wherein the ring member is integrally formed with the cylindrical portion or screwed to the cylindrical portion.

With these embodiments, the tubular member and the ring member can be easily assembled or manufactured. The cylindrical portion is easy to clean and can prevent the substances or bacteria from accumulating or growing on the joint. In addition, the cylindrical portion is easy to connect to the reduction box.

In some embodiments, the hygienic assembly further comprises a gasket arranged between the tubular member and the ring member. The gasket is used to seal the gap between the tubular member and the ring member so as to further isolate the reduction box from the environment.

In some embodiments, the housing comprises an outer rim having a plurality of through holes via which a coat or a sleeve for shielding the joint can be connected to the housing. With these embodiments, the outer rim for connecting to the coat or the sleeve is integrally formed on the housing, and arms of the robot can be shielded by the coat or the sleeve.

In some embodiments, the flange further comprises a position hole for positioning the end effector and a plurality of through holes for connecting the end effector to the flange. With the above embodiments, the end effector can be positioned accurately.

In a second aspect of the present disclosure, a hygienic robot is provided. The hygienic robot comprises: an end effector; a reduction box arranged in a joint of the robot and adapted to drive the end effector, the reduction box comprising an output member; and a hygienic assembly comprising: a housing connected to the reduction box and comprising an opening; a flange having a first end connected to the output member of the reduction box and a second end connected to the end effector; and a seal member comprising an outer ring fixed to an inner circumferential surface of the opening and a seal lip slidably contacting an outer circumferential surface of the flange.

With these embodiments, the reduction box can be at least partially covered by the housing, the flange and the seal member. Thus, a shield structure is created for the reduction box of the robot, and an outer surface of the robot is easy to clean. In addition, substances will not accumulate on the outer surface of the joint and bacteria will not grow or reproduce on the outer surface of the joint.

In some embodiments, the housing comprises: a tubular member connected to the reduction box; and a ring member arranged on the tubular member and comprising the opening.

In some embodiments, the tubular member comprises: a cylindrical portion accommodating the reduction box; and an inner connecting portion inwardly extending from the cylindrical portion and comprising at least one hole provided for at least one bolt to pass through to connect the tubular member to the reduction box, wherein the ring member is screwed to the cylindrical portion.

In some embodiments, the tubular member comprises: a cylindrical portion accommodating the reduction box, wherein an inner surface of the cylindrical portion is adhered to the reduction box, wherein the ring member is integrally formed with the cylindrical portion or screwed to the cylindrical portion.

In some embodiments, the hygienic robot further comprises a gasket arranged between the tubular member and the ring member.

In some embodiments, the housing comprises an outer rim having a plurality of through holes via which a coat or a sleeve for shielding the joint can be connected to the housing.

In some embodiments, the flange further comprises a position hole for positioning the end effector and a plurality of through holes for connecting the end effector to the flange.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an exemplary and in a non-limiting manner, wherein.

Throughout the drawings, the same or similar reference symbols are used to indicate the same or similar elements.

DETAILED DESCRIPTION OF EMBODIMENTS

Figure 1:
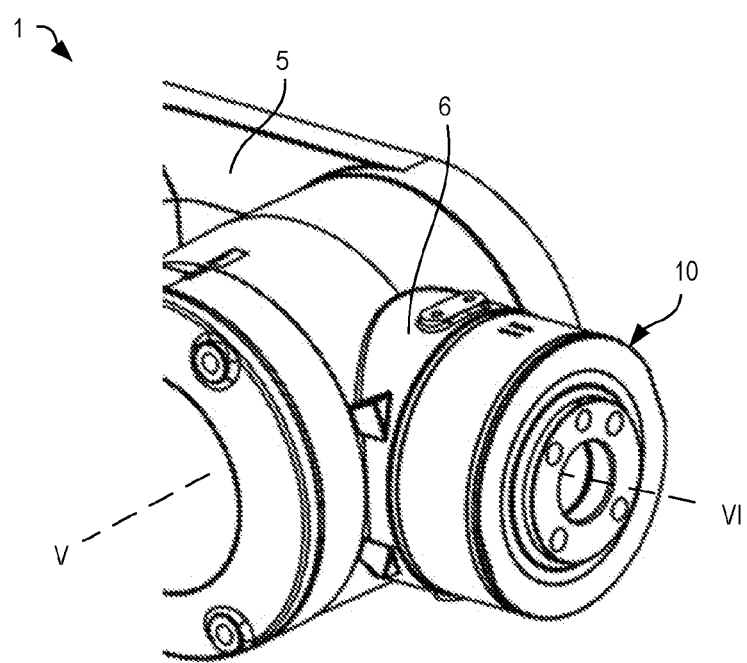
FIG. 1 schematically illustrates a perspective view of a robot equipped with a hygienic assembly according to some embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

As described above, in emerging applications of robots in some particular fields, such as food, beverage and heath care, the material of the robots might be required to prevent accumulation of substances on an exposed surface of the robots or to prevent bacteria growth and reproduction on the exposed surface. Moreover, the exposed surface should be easy to clean. Accordingly, there is a need for an improved structure for use with the robots to improve the hygienic level of the robots.

Articulated robots having a dedicated end effector at the tip are widely used in industry. Generally, in order to set the end effector in an expected position and posture, an articulated robot having six-axis joints may be provided. The end effector is connected to the sixth joint of the articulated robot. In particular fields, such as food, beverage and heath care, the end effector and the sixth joint are close to the substances in the workplace, such as powder, fluid, oil, or protein. These substances are easy to adhere and accumulate on the robot, e.g., a tool head of a bolt and/or a blind-hole of the reduction box.

With embodiments of the present disclosure, a shield structure is created for the joint or the reduction box, and an outer surface of the joint will be easy to clean.

FIG. 1 schematically illustrates a perspective view of a robot equipped with a hygienic assembly according to some embodiments of the present disclosure. In some embodiments, the robot 1 may be an articulated robot having six-axis joints. Only the fifth and sixth joints 5, 6 of the robot 1 are shown in FIG. 1. A dedicated end effector (not shown) is adapted to be connected to the sixth joint 6 of the robot 1. The sixth joint 6 rotates around a fifth axis V and the end effector connected to the sixth joint 6 rotates around a sixth axis VI. It should be understood that the present disclosure does not intend to limit the types of the robot. In other embodiments, the robot may be of other types, such as a parallel robot.

Figure 2:
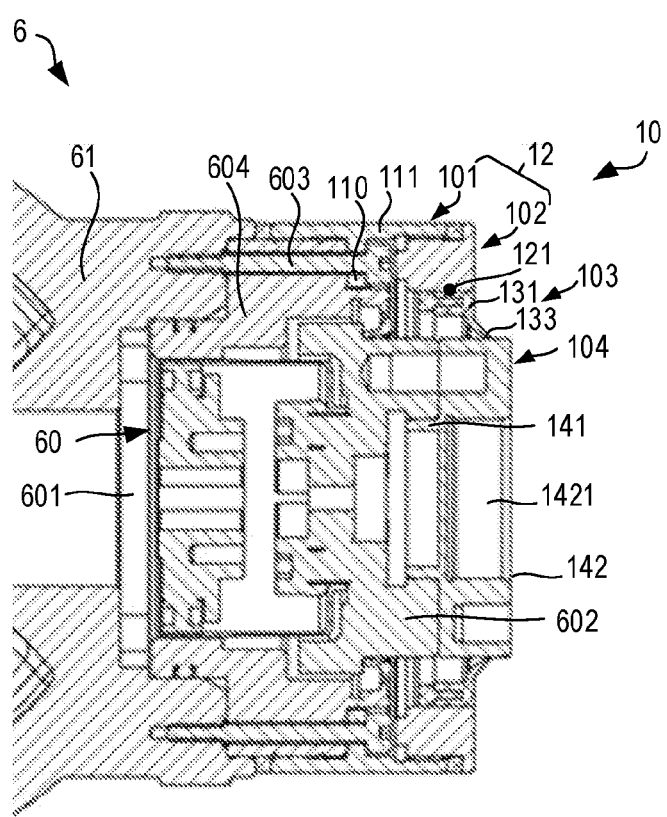
FIG. 2 schematically illustrates a cross-sectional view of the hygienic assembly of the robot of FIG. 1.

According to embodiments of the present disclosure, as shown in FIG. 1, a hygienic assembly 10 is provided for use with the robot 1. FIG. 2 schematically illustrates a cross-sectional view of the hygienic assembly 10 of the robot 1 of FIG. 1, and FIG. 3 illustrates an exploded view of the hygienic assembly 10 of the robot 1 of FIG. 1.

Figure 3:
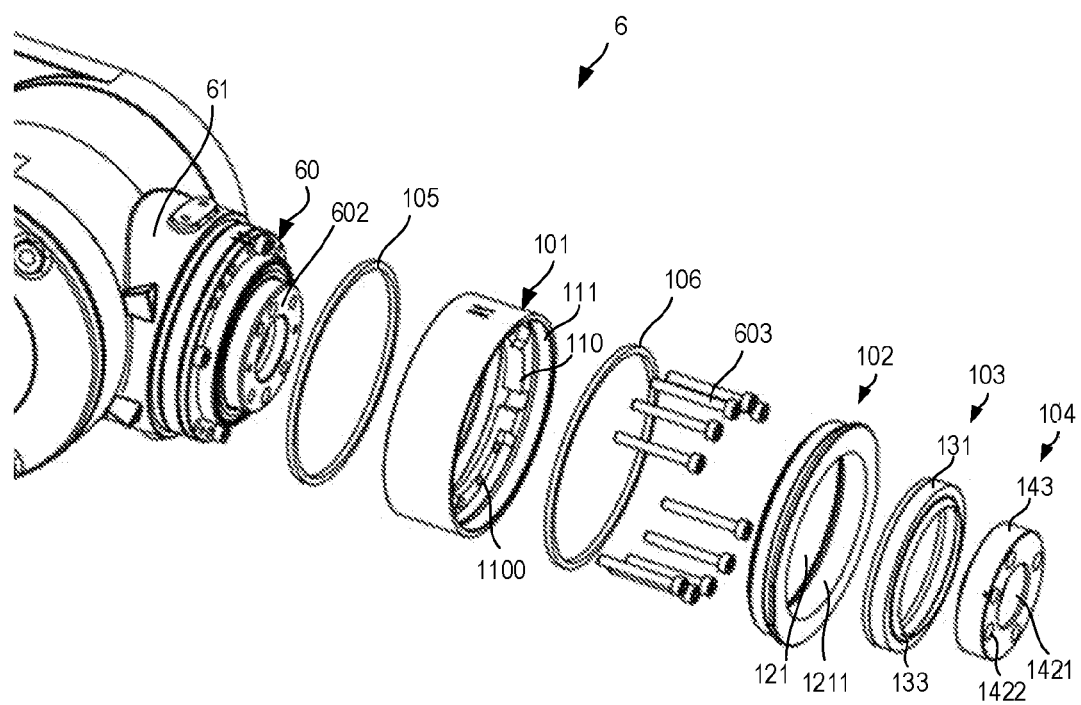
FIG. 3 schematically illustrates an exploded view of the hygienic assembly of the robot of FIG. 1.

As shown in FIGS. 2-3, the hygienic assembly 10 comprises a housing 12, a flange 104 and a seal member 103. The housing 12 is adapted to be connected to a reduction box 60 of the joint 6 of the robot 1. The housing 12 further comprises an opening 121 for receiving the flange 104 and the seal member 103.

In some embodiments, the housing 12 may comprise a tubular member 101. In these embodiments, the tubular member 101 is adapted to be connected to the reduction box 60. For example, the tubular member 101 may comprise a cylindrical portion 111 that can accommodate the reduction box 60.

In some embodiments, an inner surface of the cylindrical portion 111 can be adhered to, particularly glued to, the reduction box 60. In this way, the cylindrical portion 111 is easy to connect to the reduction box 60.

In other embodiments, the tubular member 101 may comprise an inner connecting portion 110. The inner connecting portion 110 extends from the cylindrical portion 111 inwardly. The inner connecting portion 110 may comprise at least one hole 1100. During assembly, at least one bolt 603 may pass through the at least one hole 1100 to connect the tubular member 101 to the reduction box 60. With these embodiments, the cylindrical portion 111 is easy to be disassembled from the reduction box 60 when the reduction box 60 needs maintenance.

With the hygienic assembly 10, a tool head of a bolt and/or a blind-hole of the reduction box 60 can be covered by the tubular member 101 of the housing 12. In this way, the joint 6 is easy to be cleaned and can prevent substances or bacteria from accumulating or growing on the joint 6.

In some embodiments, the housing 12 further comprises a ring member 102 arranged on the tubular member 101. The ring member 102 comprises the opening 121. In some embodiments, the ring member 102 may be screwed or adhered to the cylindrical portion 111 of the tubular member 101. In other embodiments, the ring member 102 may be integrally formed with the cylindrical portion 111. With these embodiments, the tubular member 101 and the ring member 102 can be easily assembled or manufactured. Moreover, if the ring member 102 is screwed to the cylindrical portion 111, it is easy to disassemble when the reduction box 60 needs maintenance or when checking for leakage.

As shown in FIG. 2, the flange 104 has a first end 141 for connecting to an output member 602 of the reduction box 60 and a second end 142 for connecting to the end effector. The reduction box 60 can drive the end effector via the flange 104. The output member 602 of the reduction box 60 can be covered by the hygienic assembly 10 and isolated from the environment. Further, an outer circumferential surface 143 of the flange 104 may be a smooth surface.

In some embodiments, as shown in FIGS. 2-3, the flange 104 may comprise a position hole 1421 for positioning the end effector and a plurality of through holes 1422 for connecting the end effector to the flange 104. With the above embodiments, the end effector can be positioned accurately. Further, a plurality of bolts may pass through holes of the end effector and the through holes 1422 of the flange 104, and then may be screwed to the output member 602 of the reduction box 60. Thus, the same bolts may connect the end effector, the flange 104 and the output member 602 together.

The seal member 103 comprises an outer ring 131 and a seal lip 133. The outer ring 131 is fixed to, e.g, adhered to, an inner circumferential surface 1211 of the opening 121, and the seal lip 133 can slidably contact the outer circumferential surface 143 of the flange 104, as shown in FIGS. 2-3. With the housing 12, the flange 104 and the seal member 103, the reduction box 60 can be at least partially isolated from the environment. In this way, the hygienic level of the robot 1 can be improved accordingly.

In some embodiments, the hygienic assembly 10 further comprises a gasket 106 arranged between the tubular member 101 and the ring member 102. The gasket 106 can seal the gap between the tubular member 101 and the ring member 102 so as to further isolate the reduction box 60 from the environment.

In some embodiments, the hygienic assembly 10 further comprises a gasket 105 arranged between the tubular member 101 and a body 61 of the joint 6. The gasket 105 can seal the gap between the tubular member 101 and the body 61 so as to further isolate the reduction box 60 from the environment.

Figure 4:
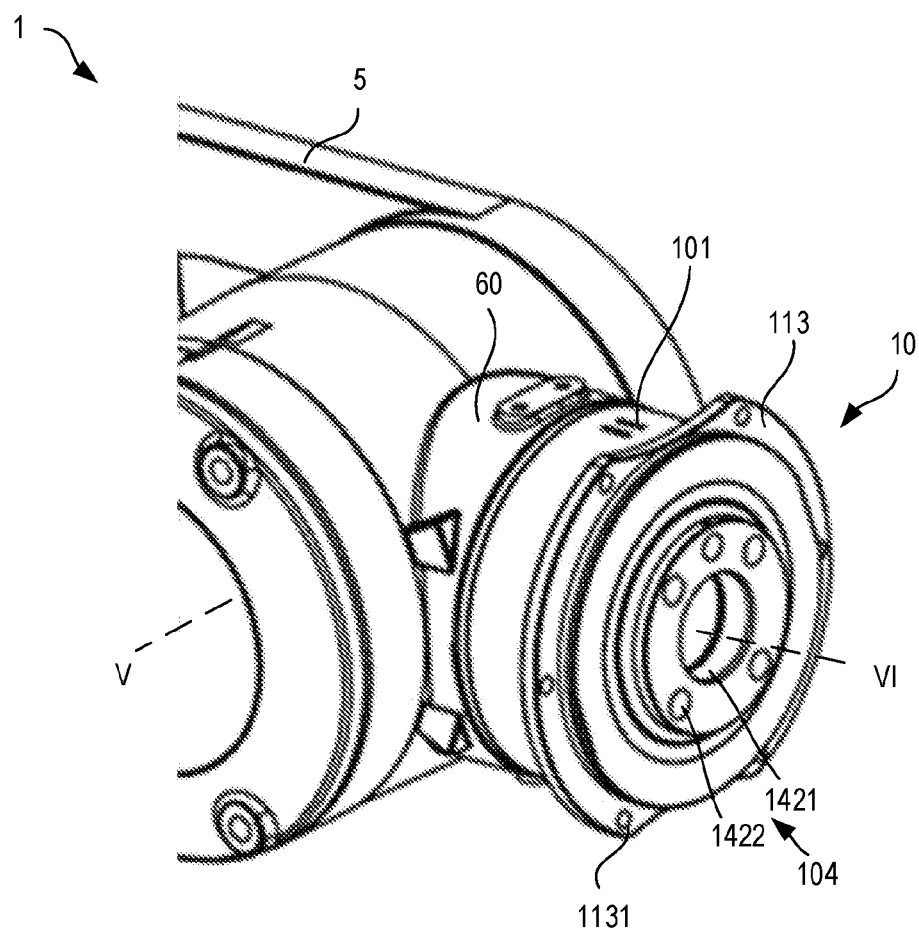
FIG. 4 schematically illustrates a perspective view of a robot equipped with a hygienic assembly according to some other embodiments of the present disclosure.
Figure 5:
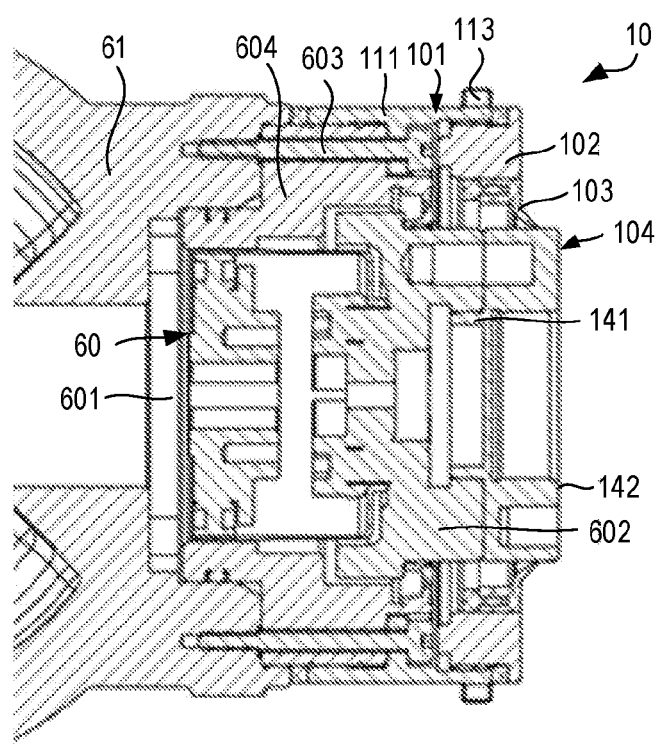
FIG. 5 schematically illustrates a cross-sectional view of a joint of the robot of FIG. 4.

FIG. 4 schematically illustrates a perspective view of a robot equipped with a hygienic assembly according to some other embodiments of the present disclosure, and FIG. 5 illustrates a cross-sectional view of the joint 6 of the robot 1 of FIG. 4.

The structure of the hygienic assembly 10 as shown in FIGS. 2-3 is similar to the structure of the hygienic assembly 10 as shown in FIGS. 4-5. Compared with the hygienic assembly 10 as shown in FIGS. 2-3, the housing 12 of the hygienic assembly 10 shown in FIGS. 4-5 further comprises an outer rim 113. The outer rim 113 has a plurality of through holes 1131 via which a coat or a sleeve for shielding the joint 6 can be connected to the housing 12. The outer rim 113 may be connected to the cylindrical portion 111. In other embodiments, the outer rim 113 may be integrally formed with the cylindrical portion 111.

Embodiments of the present disclosure also provide a hygienic robot. Referring back to FIGS. 1-3, the hygienic robot 1 comprises at least one joint, for example, six joints. In FIG. 1, only the fifth and sixth joints 5, 6 are shown. An end effector (not shown) of the robot 1 is connected to the sixth joint 6. The sixth joint 6 rotates around a fifth axis V and the end effector connected to the sixth joint 6 rotates around a sixth axis VI. To rotate the end effector, a reduction box 60 is arranged in the joint 6 of the robot 1 and the hygienic assembly 10 is assembled onto the joint 6.

It is to be understood that the present disclosure does not intend to limit the types of the robot. In some cases, the robot may be of other types, such as a parallel robot.

The reduction box 60 is used to drive the end effector (not shown). As shown in FIG. 2, the reduction box 60 comprises an output member 602 for outputting rotation movements. In some embodiments, the reduction box 60 may comprise an input member 601 that receives a driving force from an actuating device, such as a motor. In some embodiments, the reduction box 60 may comprise a casing 604 accommodating a reduction structure of the reduction box 60.

The housing 12 of the hygienic assembly 10 is connected to the reduction box 60 and comprises an opening 121. In some embodiments, the housing 12 may comprise a tubular member 101. In these embodiments, the tubular member 101 is adapted to be connected to the reduction box 60. For example, the tubular member 101 may comprise a cylindrical portion 111 that accommodates the reduction box 60.

In some embodiments, an inner surface of the cylindrical portion 111 is adhered to the reduction box 60, for example adhered to the casing 604. In this way, the cylindrical portion 111 is easy to be connected to the reduction box 60.

In other embodiments, the tubular member 101 may comprise an inner connecting portion 110. The inner connecting portion 110 extends from the cylindrical portion 111 inwardly. The inner connecting portion 110 may comprise at least one hole 1100. The at least one bolt 603 may pass through the at least one hole 1100 to connect the tubular member 101 to the reduction box 60. With these embodiments, the cylindrical portion 111 is easy to disassemble from the reduction box 60 when the reduction box 60 needs maintenance.

With these embodiments, a tool head of a bolt and/or a blind-hole of the reduction box 60 can be covered by the hygienic assembly 10. In this way, the joint 6 is easy to clean and it is possible to prevent substances or bacteria from accumulating or growing on the joint 6.

In some embodiments, the housing 12 further comprises a ring member 102 arranged on the tubular member 101. The ring member 102 comprises the opening 121. In some embodiments, the ring member 102 is screwed to the cylindrical portion 111 of the tubular member 101. In other embodiments, the ring member 102 may be integrally formed with the cylindrical portion 111. With these embodiments, the tubular member 101 and the ring member 102 can be easily assembled or manufactured.

As shown in FIG. 2, the flange 104 has a first end 141 connected to the output member 602 of the reduction box 60 and a second end 142 connected to the end effector.

The reduction box 60 can drive the end effector via the flange 104. The output member 602 of the reduction box 60 can be covered by the hygienic assembly 10 and isolated from the environment. Further, an outer circumferential surface 143 of the flange 104 may be a smooth surface.

In some embodiments, as shown in FIGS. 2-3, the flange 104 may comprise a position hole 1421 for positioning the end effector and a plurality of through holes 1422 for connecting the end effector to the flange 104. In some embodiments, a plurality of bolts may pass through holes of the end effector and the through holes 1422 of the flange 104, and then may be screwed to the output member 602 of the reduction box 60. With the above embodiments, the end effector can be positioned accurately. Moreover, the same bolts may connect the end effector, the flange 104 and the output member 602 together.

The seal member 103 comprises an outer ring 131 and a seal lip 133. The outer ring 131 is fixed to, e.g, adhered to, an inner circumferential surface 1211 of the opening 121, and the seal lip 133 slidably contacts the outer circumferential surface 143 of the flange 104, as shown in FIGS. 2-3. With the housing 12, the flange 104 and the seal member 103, the reduction box 60 can be at least partially isolated from the environment. In this way, the hygienic level of the robot 1 can be improved accordingly.

In some embodiments, the hygienic assembly 10 further comprises a gasket 106 arranged between the tubular member 101 and the ring member 102. The gasket 106 can seal the gap between the tubular member 101 and the ring member 102 so as to further isolate the reduction box 60 from the environment.

In some embodiments, the hygienic assembly 10 further comprises a gasket 105 arranged between the tubular member 101 and a body 61 of the sixth joint 6. The gasket 105 can seal the gap between the tubular member 101 and the body 61 so as to further isolate the reduction box 60 from the environment.

Referring to FIGS. 4-5, another hygienic robot 1 is provided. As shown, the housing 12 of the hygienic assembly 10 shown FIGS. 4-5 comprises an outer rim 113. The outer rim 113 has a plurality of through holes 1131. A coat or a sleeve for shielding the joint 6 can be connected to the housing 12 by means of the plurality of through holes 1131. With the coat or the sleeve, other parts of the robot 1, such as arms and cables, can be shielded from the workplace accordingly, and the hygienic level of the robot 1 can be improved. The outer rim 113 may be connected to the cylindrical portion 111. In other embodiments, the outer rim 113 may be integrally formed with the cylindrical portion 111.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. A hygienic assembly for use with a robot, the hygienic assembly comprising:
    a housing adapted to be connected to a reduction box of a joint of the robot,
        wherein the housing comprises:
            a tubular member adapted to be connected to the reduction box,
            a ring member arranged on the tubular member and comprising an opening, and
            a gasket arranged between the tubular member and the ring member;
    a flange having a first end for connecting to an output member of the reduction box and a second end for connecting to an end effector; and
    a seal member comprising an outer ring fixed to an inner circumferential surface of the opening and a seal lip slidably contacting an outer circumferential surface of the flange.

2. The assembly of claim 1, wherein the tubular member comprises:
    a cylindrical portion adapted to accommodate the reduction box; and
    an inner connecting portion inwardly extending from the cylindrical portion and comprising at least one hole provided for at least one bolt to pass through to connect the tubular member to the reduction box;
    wherein the ring member is screwed to the cylindrical portion.

3. The assembly of claim 1, wherein the tubular member comprises:
    a cylindrical portion adapted to accommodate the reduction box, wherein an inner surface of the cylindrical portion is adapted to be adhered to the reduction box;
    wherein the ring member is integrally formed with the cylindrical portion or screwed to the cylindrical portion.

4. The assembly of claim 1, wherein the housing comprises an outer rim having a plurality of through holes via which a coat or a sleeve for shielding the joint can be connected to the housing.

5. The assembly of claim 1, wherein the flange further comprises a position hole for positioning the end effector and a plurality of through holes for connecting the end effector to the flange.

6. A hygienic robot comprising:
    an end effector;
    a reduction box arranged in a joint of the robot and adapted to drive the end effector, the reduction box comprising an output member; and
    a hygienic assembly comprising:
        a housing connected to the reduction box,
            wherein the housing comprises:
                a tubular member connected to the reduction box;
                a ring member arranged on the tubular member and comprising an opening, and
                a gasket arranged between the tubular member and the ring member;
        a flange having a first end connected to the output member of the reduction box and a second end connected to the end effector; and
        a seal member comprising an outer ring fixed to an inner circumferential surface of the opening and a seal lip slidably contacting an outer circumferential surface of the flange.

7. The robot of claim 6, wherein the tubular member comprises:
    a cylindrical portion accommodating the reduction box; and
    an inner connecting portion inwardly extending from the cylindrical portion and comprising at least one hole provided for at least one bolt to pass through to connect the tubular member to the reduction box;
    wherein the ring member is screwed to the cylindrical portion.

8. The robot of claim 6, wherein the tubular member comprises:

a cylindrical portion accommodating the reduction box, wherein an inner surface of the cylindrical portion is adhered to the reduction box;

wherein the ring member is integrally formed with the cylindrical portion or screwed to the cylindrical portion.

9. The robot of claim 6, wherein the housing comprises an outer rim having a plurality of through holes via which a coat or a sleeve for shielding the joint can be connected to the housing.

10. The robot of claim 6, wherein the flange further comprises a position hole for positioning the end effector and a plurality of through holes for connecting the end effector to the flange.

* * * * *